(12) United States Patent
Johnson

(10) Patent No.: US 6,398,824 B1
(45) Date of Patent: Jun. 4, 2002

(54) METHOD FOR MANUFACTURING A THIN-FILM LITHIUM BATTERY BY DIRECT DEPOSITION OF BATTERY COMPONENTS ON OPPOSITE SIDES OF A CURRENT COLLECTOR

(75) Inventor: Lonnie G. Johnson, Atlanta, GA (US)

(73) Assignee: Excellatron Solid State, LLC, Smyra, GA (US)

( * ) Notice: Subject to any disclaimer, the term of this patent is extended or adjusted under 35 U.S.C. 154(b) by 0 days.

(21) Appl. No.: 09/684,899

(22) Filed: Oct. 10, 2000

Related U.S. Application Data

(63) Continuation-in-part of application No. 09/286,112, filed on Apr. 2, 1999, now Pat. No. 6,242,129.

(51) Int. Cl.$^7$ ................................................ H01M 6/18
(52) U.S. Cl. ...................... 29/623.1; 429/127; 429/162; 429/231.95
(58) Field of Search ................................ 429/127, 162, 429/231.95; 29/623.1, 623.5

(56) References Cited

U.S. PATENT DOCUMENTS

| | | | |
|---|---|---|---|
| 3,237,078 A | 2/1966 | Mallory | ........................ 320/17 |
| 3,393,355 A | 7/1968 | Whoriskey et al. | ........... 320/18 |

(List continued on next page.)

OTHER PUBLICATIONS

Journal of Power Sources, P. Fragnaud, R. Nagarajan, D.M. Schleich, D. Vujic, Thin–film cathodes for secondary lithium batteries, 1995, vol. 54, pp 362–366, No Month.

Materials Research Society, The Preparation and Characterization of Lithium Cobalt Oxide Thin Films by LPCVD, 1996, Mat. Res. Soc. Symp. Proc. vol. 415 pp 213–217, No Month.

Journal of Power Sources, Thin film solid electrolytes and electrodes for rechargeable lithium–ion batteries, J. Schoonman, E.M. Kelder, 1997, vol. 68 pp. 65–68, No Month.

Solid State Ionics, Fabrication of $LiCoO_2$ thin film cathodes for rechargeable lithium battery by electrostatic spray pyrolysis, C.H. Chen et al., 1995, vol. 80 pp. 1–4, No Month.

Journal of Materials Science, Unique porous $LiCoO_2$ thin layers prepared by electrostatic spray deposition. C.H. Chen et al., 1996, vol. 31, Journal of Material Science, pp 5437–5442, No Month.

*Primary Examiner*—Gabrielle Brouillette
*Assistant Examiner*—Susy Tsang-Foster
(74) *Attorney, Agent, or Firm*—Baker, Donelson, Bearman & Caldwell

(57) ABSTRACT

A method of manufacturing a thin film battery cell (10) is disclosed wherein a cathode current collector (11) is passed through a cathode chamber wherein two oppositely disposed cathode layers (12) are deposited upon opposite faces of the cathode current collector (11). Two oppositely disposed electrolyte layers (13) are then deposited upon opposite faces of the combination of the cathode current collector (11) and cathode layers (12). Two oppositely disposed anode layers (14) are then deposited upon opposite faces of the combination of the cathode current collector (11), cathode layers (12) and electrolyte layers (13). An anode current collector (16) may then be coupled to the two anode layers (14).

27 Claims, 4 Drawing Sheets

U.S. PATENT DOCUMENTS

| | | | |
|---|---|---|---|
| 4,303,877 A | 12/1981 | Meinhold | 320/18 |
| 4,614,905 A | 9/1986 | Petersson et al. | 320/18 |
| 4,654,281 A | 3/1987 | Anderman et al. | 429/209 |
| 4,719,401 A | 1/1988 | Altmejd | 320/13 |
| 5,270,635 A | 12/1993 | Hoffman et al. | 320/21 |
| 5,291,116 A | 3/1994 | Feldstein | 320/4 |
| 5,314,765 A | 5/1994 | Bates | 429/194 |
| 5,336,573 A | 8/1994 | Zuckerbrod et al. | 429/252 |
| 5,338,625 A | 8/1994 | Bates et al. | 429/193 |
| 5,362,581 A | 11/1994 | Chang et al. | 429/249 |
| 5,387,857 A | 2/1995 | Honda et al. | 320/18 |
| 5,411,592 A | 5/1995 | Ovshinsky et al. | 118/718 |
| 5,435,054 A * | 7/1995 | Tonder et al. | |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,597,660 A | 1/1997 | Bates et al. | 429/191 |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |
| 6,143,042 A * | 11/2000 | Rogers | |
| 6,287,728 B1 * | 9/2001 | Kajiura et al. | |
| 6,291,097 B1 * | 9/2001 | Barker et al. | |

\* cited by examiner

|  | Energy Whr/kg | Power W/kg | VOL Whr/l | Cycle Life | COST $/Whr |
|---|---|---|---|---|---|
| NiCd | 60 | 200 | 100 | 100 | 0.70 |
| NiMH | 90 | 100 | 160 | 200 | 0.87 |
| LLI | 120 | 200 | 300 | 300 | 0.95 |
| Li Poly | 125 | 100 | 250 | 500 | 0.65 |
| MLB Li-Ion | 250 | 2500 | 1041 | >10000 | 0.75 |
| MLB Li Metal | 300 | 6000 | 959 | >10000 | 0.75 |

*FIG. 5*

METHOD FOR MANUFACTURING A THIN-FILM LITHIUM BATTERY BY DIRECT DEPOSITION OF BATTERY COMPONENTS ON OPPOSITE SIDES OF A CURRENT COLLECTOR

REFERENCE TO RELATED APPLICATION

This is a continuation-in-part of U.S. patent application No. 09/286,112 filed Apr. 2, 1999, now U.S. Pat. No. 6,242,129.

TECHNICAL FIELD

This invention relates generally to thin film batteries, and more particularly to a method of producing thin film, rechargeable lithium ion batteries.

BACKGROUND OF THE INVENTION

Conventional, canister type batteries today include toxic materials such as cadmium, mercury, lead and acid electrolytes. These chemicals are presently facing governmental regulations or bans as manufacturing materials, thus limiting their use as battery components. Another limitation associated with them is that the amount of energy stored and delivered by these batteries is directly related to their size and weight. Large batteries, such as those found in automobiles, produce large amounts of current but have very low energy densities (Watts hours per liter) and specific energies (Watt hours per gram). As such, they require lengthy recharge times which render them impractical for many uses.

To address the need for higher energy densities and specific energies, the battery industry has been moving towards lithium based batteries. The major focus of the battery industry has been on liquid and polymer electrolyte systems. However, these systems have inherent safety problems because of the volatile nature of the electrolyte solvents. These types of batteries have a relatively high ratio of inert material components, such as the current collector, separator, and substrate, relative to the active energy storage materials used for the anode and cathode. In addition, their relatively high internal impedance results in low rate capability (watts/kilogram) which renders them impractical for many applications.

Thin film lithium batteries have been produced which have a stacked configuration of films commencing with an inert ceramic substrate upon which a cathode current collector and cathode are mounted. A solid state electrolyte is deposited upon the cathode, an anode in turn deposited upon the electrolyte, and an anode current collector mounted upon the anode. Typically, a protective coating is applied over the entire cell. Lithium batteries of this type are describe in detail in U.S. Pat. Nos. 5,569,520 and 5,597,660, the disclosures of which are specifically incorporated herein. These lithiated cathode material of these batteries have a (003) alignment of the lithium cells, as shown in FIG. 1, which creates a high internal cell resistance resulting in large capacity losses.

Recently, it has been discovered that the annealing of lithiated cathode materials on a substrate under proper conditions results in batteries having significantly enhanced performances, for the annealing causes the lithiated material to crystallize. This crystallized material has a hexagonal layered structure in which alternating planes containing Li and Co ions are separated by close packed oxygen layers. It has been discovered that $LiCoO_2$ films deposited onto an alumina substrate by magnetron sputtering and crystallized by annealing at 700° C. exhibit a high degree of preferred orientation or texturing with the layers of the oxygen, cobalt and lithium are oriented generally normal to the substrate, i.e. the (101) plane as shown in FIG. 2. This orientation is preferred as it provides for high lithium ion diffusion through the cathode since the lithium planes are aligned parallel to the direction of current flow. It is believed that the preferred orientation is formed because the extreme heating during annealing creates a large volume strain energy oriented generally parallel to the underlying rigid substrate surface. As the crystals form they naturally grow in the direction of the least energy strain, as such the annealing process and its resulting volume strain energy promotes crystal growth in a direction generally normal to the underlying substrate surface, which also is the preferred orientation for ion diffusion through the crystal.

However, the limitations of these batteries have been the thickness and weight of their substrates upon which the layers of active material are laid upon. Because of the size of the substrate, these batteries have not been competitive with other formulations in terms of energy density and specific energy. High energy density cells have not been successfully constructed. The supporting substrates have been made of relatively thick sheets of alumina, sapphire, silica glass and various other types of ceramic material. The current collector and substrate of these batteries typically constitute nearly 70% of the total weight and an even larger percentage of the volume, thus only a small amount of the of the battery weight and volume is attributed to the active materials. This ratio of active material to the overall weight and volume of the battery limits their use. The performance of these batteries are also limited by the amount of surface area interfacing between adjacent components, such as between the cathode current collector and cathode, between the cathode and electrolyte, between the electrolyte and anode, and between the anode and anode current collector. This limited area of interface degrades the current flow through the battery.

To increase the interface area some batteries have been developed wherein a current collector has two opposite sides coupled to the reactive material. As shown in U.S. Pat. No. 4,092,464, these batteries are typically manufactured by simply folding over each layer of component over each successive interior layer. As each component is assembled by folding over the prior component the connection between each successive layer may not be continuous, i.e. there may be gaps or incompleteness in the connection between layers. These gaps again limit the performance of the battery.

It thus is seen that a need remains for a high performance rechargeable, thin film lithium battery which is smaller and lighter than those of the prior art and which may be manufactured to optimize the interface between successive components. Accordingly, it is to the provision of such that the present invention is primarily directed.

SUMMARY OF THE INVENTION

In a preferred form of the invention, a method of manufacturing a thin film battery comprises the steps of providing a substantially planar cathode current collector having two oppositely disposed generally planar surfaces, depositing a first cathode layer upon one cathode current collector surface, depositing a second cathode layer upon the other cathode current collector surface, depositing a first electrolyte layer upon the first cathode layer, depositing a second electrolyte layer upon the second cathode layer, depositing a first anode layer upon the first electrolyte layer, and depositing a second anode layer upon the second electrolyte layer.

BRIEF DESCRIPTION OF THE DRAWINGS

FIG. 5 is a table showing a comparison of different batteries.

DETAILED DESCRIPTION

Figure 2:
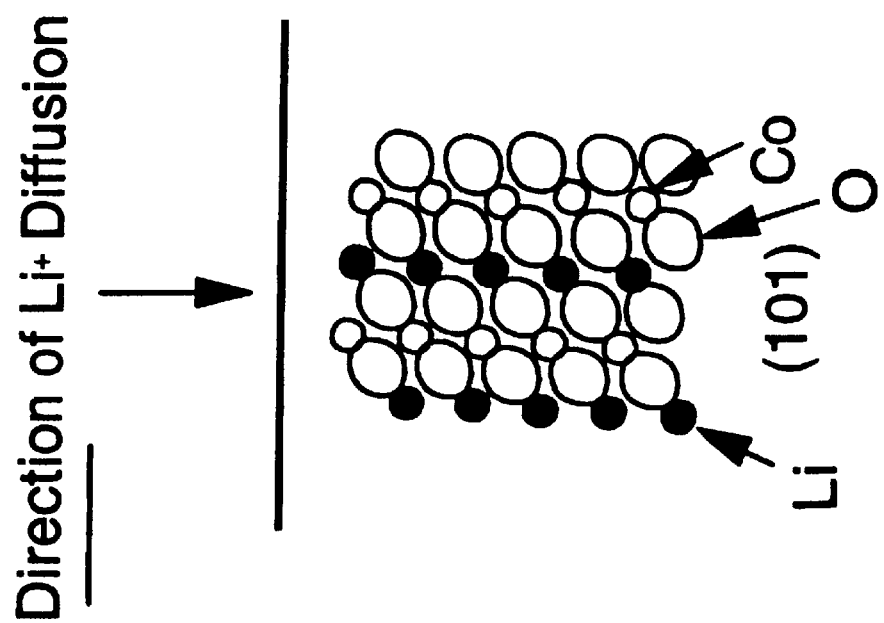
FIG. 2 is an illustration of a lithium intercalation compound oriented along the preferred (101) plane.
Figure 1:
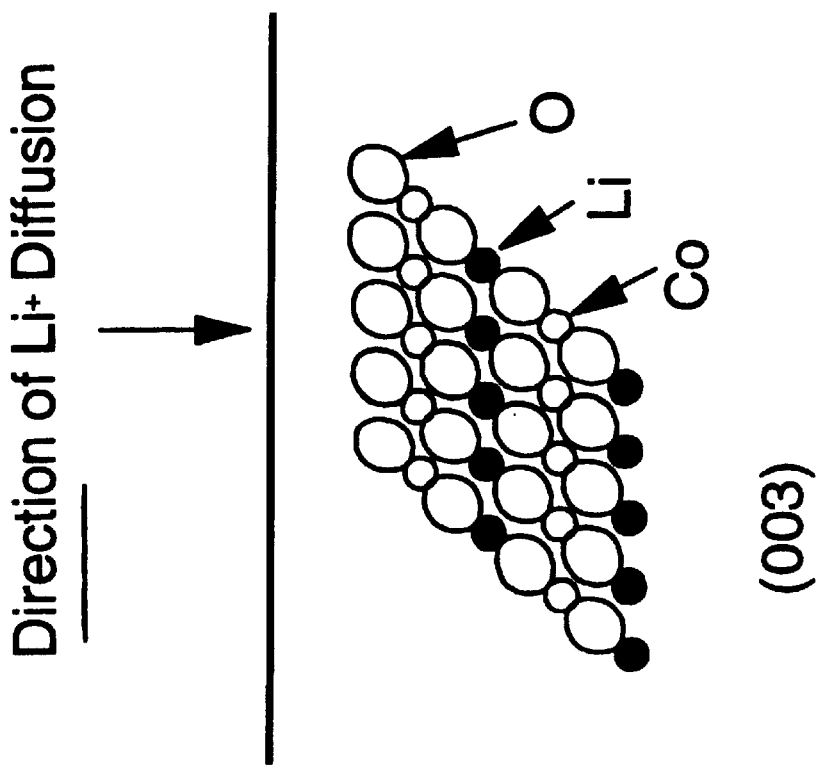
FIG. 1 is an illustration of a lithium intercalation compound oriented along the (003) plane.

With reference next to the drawings, there is shown in a rechargeable, thin film lithium battery cell 10 embodying principles of the invention in a preferred form. The battery cell 10 has an aluminum cathode current collector 11 sandwiched between two cathodes 12. The cathodes 12 are made of a lithium intercalation compound, preferably a metal oxide such as $LiNiO_2$, $V_2O_5$, $Li_xMn_2O_4$, $LiCoO_2$ or $TiS_2$. Each cathode 12 has a solid state electrolyte 13 formed thereon. The electrolyte 13 is preferable made of lithium phosphorus oxynitride, $Li_xPO_yN_z$. In turn, each electrolyte 13 has an anode 14 deposited thereon. The anode 14 is preferably made of silicon-tin oxynitride, SiTON, when used in lithium ion batteries, or other suitable materials such as lithium metal, zinc nitride or tin nitride. Finally, an anode current collector 16, preferably made of copper or nickel, contacts both anodes 14 to substantially encase the cathode collector 11, cathode 12, electrolyte 13 and anode 14. A solderable contact 16 may be mounted in electrical contact with the cathode current collector 11.

The battery cell 10 is preferably manufactured in the following manner. A web of approximately 4 micron thick aluminum foil is passed through a plasma treatment station to remove any oil residue from the foil. The aluminum foil is passed through a cathode Leybold chamber equipped with two large cryopumps and a series of rf or dc magnetron sputtering or diode sputtering cathodes positioned around a rotating drum in a substantially pure oxygen atmosphere. The sputtering cathodes deposit an approximately 3 micron thick cathode onto one side of the foil. The aluminum foil is then flips so that the magnetrons deposit a 3 micron thick cathode on the opposite side of the foil.

The coated foil is next removed from the coating chamber and segmented into pieces that are clamped onto aluminum frames. These frames act as both means for handling the material during processing and means for providing accurate mask registration during deposition of the materials. The coated foil is then sintered for approximately eight hours at a temperature of approximately 600° C. to crystallize the cathode material.

The electrolyte 13 is then deposited upon the cathodes 12 by the sputtering of lithium orthophosphate, $Li_5PO_4$, in a nitrogen atmosphere to produce a lithium phosphorus oxynitride layer. Similarly, each anode 14 is applied to the corresponding electrolyte 13 by sputtering. The anode current collector 16 is then deposited onto the anode by the sputtering of copper or nickel.

It has been found that crystallized lithium material deposited upon the aluminum collector and annealed at 600° C. has the preferred (101) crystal growth plane orientation shown in FIG. 2. This orientation is believed to be achieved by minimizing the volume strain energy and maximizing the surface energy during crystal growth through the difference in the thermal expansion coefficient between the aluminum cathode collector and the lithium intercalation compound cathode. The thermal expansion coefficient of the aluminum cathode collector is $13.3 \times 10^{-6}/°F$. while the thermal expansion coefficient of the cathode material ($LiCoO_2$) is $4.5 \times 10^{-6}/°F$.

Figure 6:
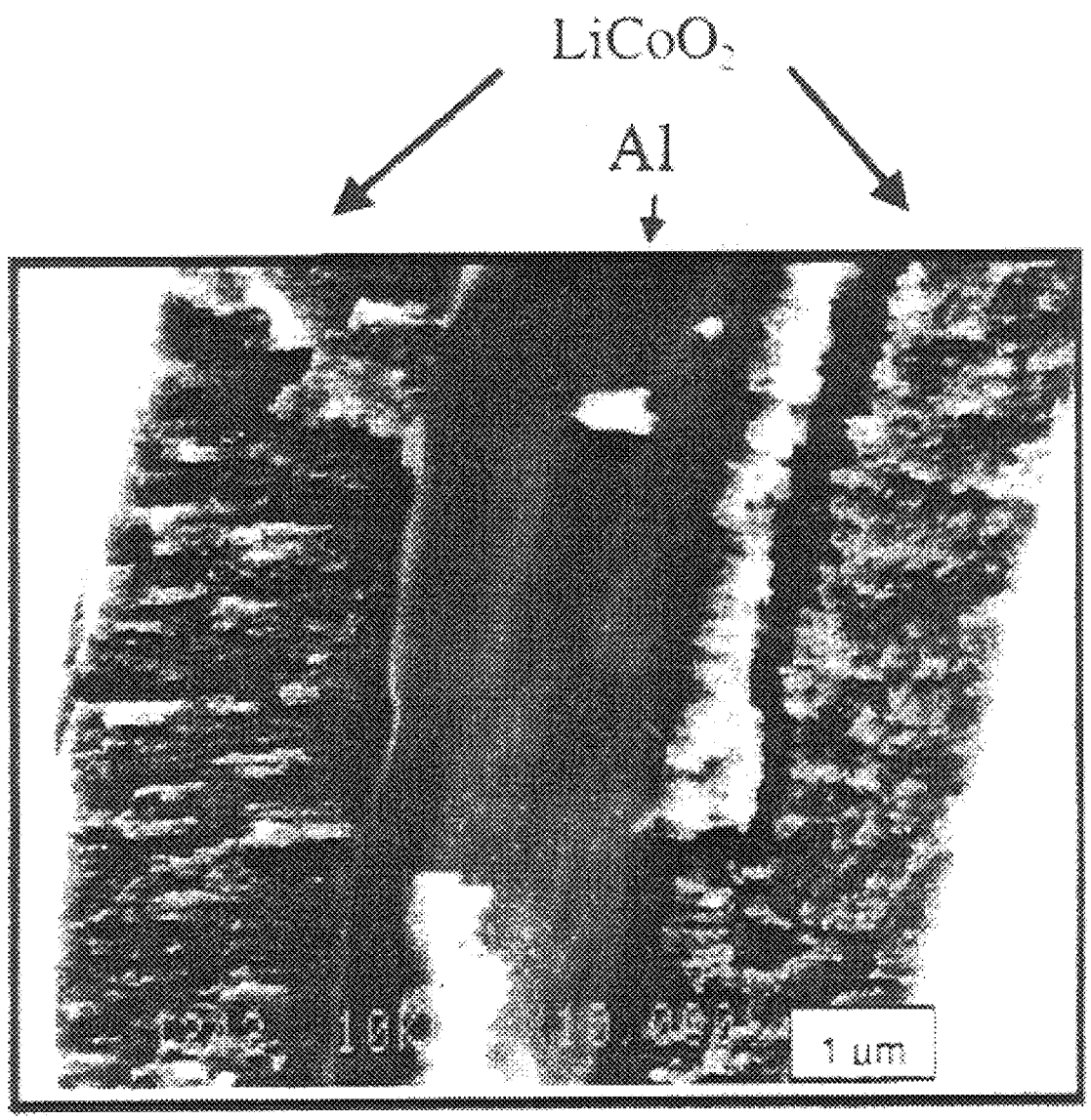
FIG. 6 is a photocopy of a photograph showing the aluminum cathode collector and lithiated cathode of the thin film lithium battery of FIG. 3.

The difference in the coefficients results in intension or compression strain in the lattice of the lithium intercalation material. It is this volumetric stress energy between the aluminum and the cathode which causes the re-orientation of the lithiated material from an amorphous condition to the crystalline (101) plane. The alignment of the lithiated material is illustrated in FIG. 6 which shows the lithiated cathode 12 aligned generally normal to the underlying aluminum collector 11, illustrated by the streaking of the cathode. This effective annealing at a temperature of 600° C. on an aluminum film greatly improves the efficiencies in the manufacturing of the battery. Successful annealing on an aluminum substrate is remarkable because the annealing temperature of 600° C. is very close to the aluminum melting temperature of 648° C. The aluminum has almost no structural strength at this temperature and therefore is very limited in its ability to apply the required strain energy to the cathode material deposited thereon.

Figure 4:
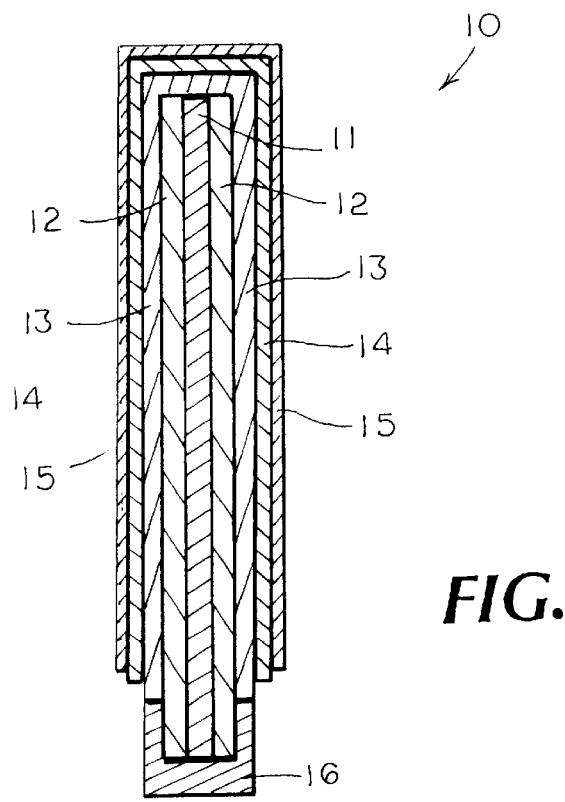
FIG. 4 is a cross-sectional view of the thin film lithium battery of FIG. 3 taken along plane 4—4.
Figure 3:
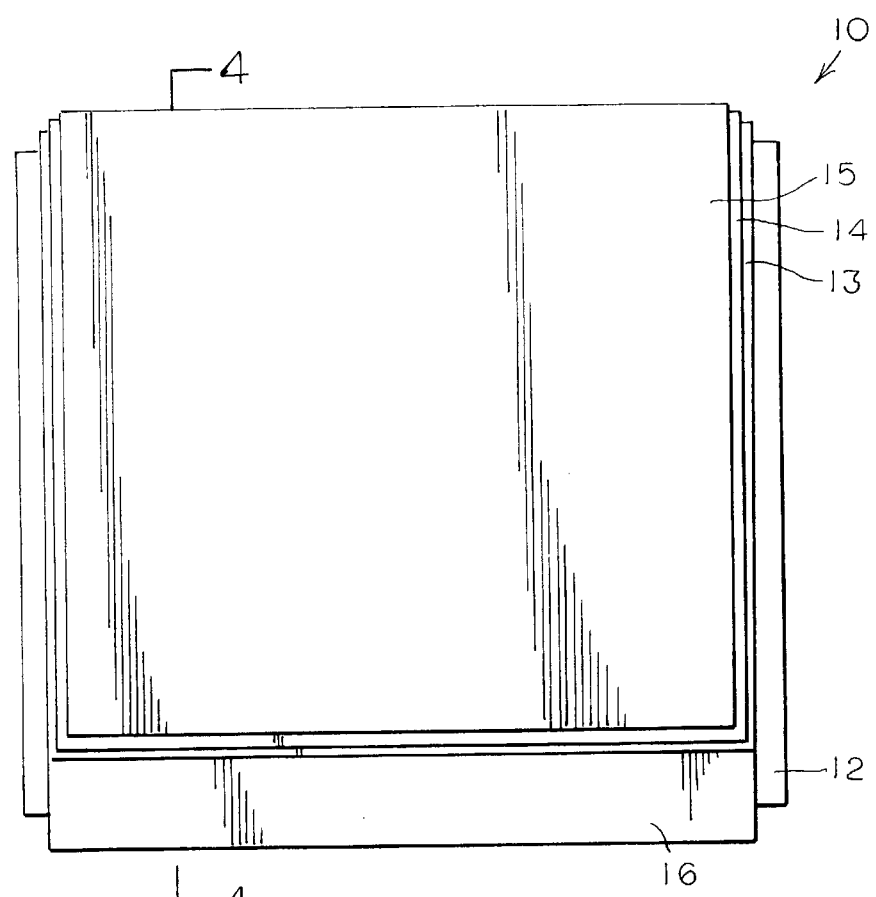
FIG. 3 is a plan view of a thin film lithium battery illustrating principles of the invention in a preferred embodiment.

As best shown in FIGS. 3 and 4, the end of the cathode collector is exposed so that the battery cell may be conventionally connected to other similar cells in either an electrical series or in parallel circuit.

The just described battery cell is fabricated with a surface area of approximately ten (10) square centimeters, a weight of approximately $5.4 \times 10^{-2}$ grams, and a thickness of approximately 14 microns. This configuration shows a capacity of 82.4 milliamp hours. Using 82.4 milliamps as the 1C charge or discharge rate, these cells show a degradation of less than 20% at discharge rates of over 10C, i.e. 824.0 milliamps. The energy density of the cell is approximately 293 Watt hours per kilogram based on the combined masses of the cathode, electrolyte, current collectors and anode. It should be noted that the cell does not have an initial substrate which was previously required in the production of thin film lithium batteries. This advantageously reduces the weight and thickness as compared to those thin film lithium batteries of the prior art which utilized other heavier and thicker substrates.

FIG. 5 shows a comparison of the inventive lithium ion battery (MLI Li-Ion) and inventive lithium metal battery MLI (Li Metal) with a lithium polymer battery (Li Poly), liquid lithium ion battery (LLI), nickel metal hydride battery (NiMH) and nickel cadmium battery (NiCd). The table of FIG. 5 illustrates that the inventive batteries deliver a substantial increase in energy (Whr/kg), a dramatic increase in power (W/kg), a dramatic increase in the energy for a given volume size (Whr/l) and a dramatic increase in the number of times the battery may be cycled through charges and discharges. The decrease in the size and weight of the cells allows batteries to be manufactured smaller and lighter without decreasing their capacity and power output, as compared to batteries of the prior art. Alternatively, because of the reduced thickness of the cells, the number of cells in a battery may be increased to achieve a greater capacity without increasing the battery size and weight as compared with previously manufactured thin film lithium battery cells that utilize an underlying substrate.

The battery being composed of two oppositely disposed layers of active material upon one common current collector reduces the amount of inactive or inert material within a battery cell. This reduction further decreases the ratio of inert material components relative to the active energy storage materials.

It is believed that the aluminum foil may be pre-annealed prior to the deposition of the cathode material so limit deformation of the aluminum foil.

It should be understood that an insulator, such as parylene, may be used to fill any spaces between these components and the anode current collector 16.

It should be understood that the aluminum foil need not be pure aluminum. Certain aluminum allows may also be utilized, hence the term aluminum used herein also refers to aluminum alloys. Also, the aluminum foil may include a thin coating of cobalt or titanium deposited by conventional sputtering methods. Lastly, the just described method of manufacturing may be utilized with current collectors comprised of other metals, and is not limited to aluminum current collectors.

The two opposite sides of the battery components (cathode, electrolyte, anode and anode current collector) may be deposited simultaneously rather than depositing sequentially upon one side then the other.

It should be understood that the sputtering process is equivalent to other methods of chemical and physical vapor deposition, i.e. reactive sputtering or reactive evaporation, such as e-beam evaporation, chemical vapor deposition. As such, the term deposition or deposited as used herein is meant to include all such methods and their equivalents, but is not meant to include method of physically combining two or more preformed layers together, such as with pressure or binding elements. The direct deposition of the battery components assures a complete, uninterrupted bond between adjacent components, which could not be achieved with prior art methods of manufactured wherein the components were simply folded about each internally disposed layer.

It should also be understood that the term electrode may be used herein to refer to either the cathode or the anode, and that the method also incorporates a method of manufacturing a battery wherein the central current collector is associated with the anode rather than the cathode as described in the preferred embodiment.

It thus is seen that a method of producing a high rate capability battery is now provided which is lighter and smaller than those of the prior art. It should of course be understood that many modifications may be made to the specific preferred embodiment described herein without departure from the spirit and scope of the invention as set forth in the following claims.

What is claimed is:

1. A method of manufacturing a thin film battery comprising the steps of:
    (a) providing a substantially planar cathode current collector having two oppositely disposed generally planar surfaces;
    (b) depositing a first cathode layer upon one cathode current collector surface;
    (c) depositing a second cathode layer upon the other cathode current collector surface;
    (d) depositing a first electrolyte layer upon the first cathode layer;
    (e) depositing a second electrolyte layer upon the second cathode layer;
    (f) depositing a first anode layer upon the first electrolyte layer, and
    (g) depositing a second anode layer upon the second electrolyte layer.

2. The method of claim 1 wherein steps (b) and (c) are performed in sequence.

3. The method of claim 1 wherein steps (b) and (c) are performed simultaneously.

4. The method of claim 1 wherein the first and second cathode layers are comprised of a lithium intercalation material.

5. The method of claim 1 further comprising step (h) of coupling the first and second anodes to an anode current collector.

6. The method of claim 1 further comprising the step of annealing the cathode current collector prior to step (b).

7. The method of claim 1 further comprising the step of annealing the first and second cathode layers prior to step (d).

8. The method of claim 6 further comprising the step of annealing the first and second cathode layers prior to step (d).

9. A method of producing a thin film battery comprising the steps of:
    (a) providing a substantially planar cathode current collector;
    (b) depositing two oppositely disposed cathode layers upon opposite sides of the cathode current collector;
    (c) depositing two oppositely disposed electrolyte layers upon the combined cathode current collector and cathode layers, and
    (d) depositing two oppositely disposed anode layers upon the combined electrolyte, cathode current collector, and cathode layers.

10. The method of claim 9 wherein the cathode layers are comprised of a lithium intercalation material.

11. The method of claim 9 further comprising step (e) coupling the anode layers to an anode current collector.

12. The method of claim 9 further comprising the step of annealing the cathode current collector prior to step (b).

13. The method of claim 9 further comprising the step of annealing the cathode layers prior to step (c).

14. The method of claim 12 further comprising the step of annealing the cathode layers prior to step (c).

15. A method of producing a thin film battery comprising the steps of:
    (a) providing a cathode current collector;
    (b) depositing a cathode upon opposite sides of the cathode current collector;
    (c) depositing an electrolyte upon opposite sides of the cathode and cathode current collector combination, and
    (d) depositing an anode upon opposite sides of the electrolyte, cathode and cathode current collector combination.

16. The method of claim 15 wherein the cathode is comprised of a lithium intercalation material.

17. The method of claim 15 further comprising step (e) of coupling the anode to an anode current collector.

18. The method of claim 15 further comprising the step of annealing the cathode current collector prior to step (b).

19. The method of claim 15 further comprising the step of annealing the cathode prior to step (c).

20. The method of claim 18 further comprising the step of annealing the cathode prior to step (c).

21. A method of producing a thin film battery comprising the steps of:
(a) providing a substantially planar first electrode current collector;
(b) depositing two oppositely disposed first electrode layers upon opposite sides of the first electrode current collector;
(c) depositing two oppositely disposed electrolyte layers upon the combined first electrode current collector and first electrode layers, and
(d) depositing two oppositely disposed second electrode layers upon the combined electrolyte, first electrode current collector, and first electrode layers.

22. The method of claim 21 wherein the first electrode layers are cathodes.

23. The method of claim 22 wherein the cathode layers are comprised of a lithium intercalation material.

24. The method of claim 21 further comprising the step of annealing the first electrode current collector prior to step (b).

25. The method of claim 23 further comprising the step of annealing the cathode prior to step (c).

26. The method of claim 21 wherein said first electrode layers are anodes.

27. The method of claim 26 wherein said second electrode layers are cathodes.

\* \* \* \* \*